(12) United States Patent
Eto et al.

(10) Patent No.: US 7,706,244 B2
(45) Date of Patent: Apr. 27, 2010

(54) INFORMATION RECORDING MEDIA AND PLAYBACK POWER DETERMINING METHOD FOR SIGNAL PLAYBACK

(75) Inventors: Soichiro Eto, Tokyo (JP); Toshimichi Shintani, Kodaira (JP); Hiroyuki Minemura, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 170 days.

(21) Appl. No.: 12/108,809

(22) Filed: Apr. 24, 2008

(65) Prior Publication Data

US 2008/0267050 A1 Oct. 30, 2008

(30) Foreign Application Priority Data

Apr. 25, 2007 (JP) ............... 2007-115006

(51) Int. Cl.
*G11B 7/24* (2006.01)
(52) U.S. Cl. .................................. 369/275.4
(58) Field of Classification Search ... 369/275.1–275.5, 369/288, 283, 277, 280, 100, 44.23, 53.1, 369/53.11, 59.11, 13.26
See application file for complete search history.

(56) References Cited

U.S. PATENT DOCUMENTS

2009/0080311 A1* 3/2009 Shintani et al. ............. 369/100

OTHER PUBLICATIONS

Kouichi Yasuda, et al., Premastered Optical Disk by Superresolution, Japan J. Appl. Phys. vol. 32 (1993) pp. 5210-5213 part 1, No. 11b.
Jooho Kim, et al., Signal Characteristics of Super-Resolution Near-Field Structure Disk in Blue Laser System, Japanese Journal of Applied Physics vol. 42, No. 7B (2004) pp. 4921-4924.
Toshimichi Shintani, et al., Sub-Terabyte-Data-Capacity Optical Discs Realized by Three-Dimensional Pit Selection, Japanese Journal of Applied Physics vol. 45. No. 4A, 2006-, pp. 2593-2597.

* cited by examiner

*Primary Examiner*—Ali Neyzari
(74) *Attorney, Agent, or Firm*—Antonelli, Terry, Stout & Kraus, LLP.

(57) ABSTRACT

A super resolution optical disk medium having an array of pits less than or equal in size to optical resolution is disclosed, wherein the pits are read by using heat generated within the medium upon irradiation of a read laser beam. A playback power determination method for use with the disk is also disclosed. A playback power level at which super resolution occurs is determined based on a bit error rate (bER) of the optical disk and the amplitude of a playback signal having a predefined signal pattern. In the optical disk, NR/SR is set to one (1) or less, where SR is the signal obtained from a high-temperature region in case the playback is performed in the state that the super resolution occurs, and NR is the amplitude of a signal which is read in the absence of such super resolution.

8 Claims, 10 Drawing Sheets

FIG.2A  NR(Lmax)/SR(Lmin)=0
        bER<10⁻⁶
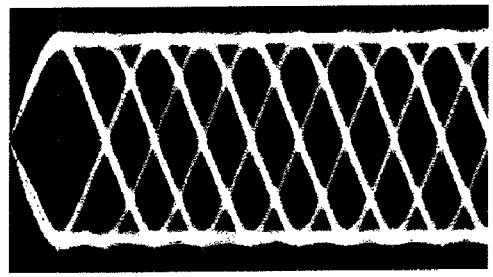
FIG.2B  NR(Lmax)/SR(Lmin)= 0.1
        bER<10⁻⁶
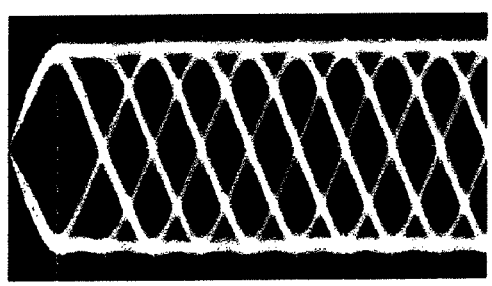
FIG.2C  NR(Lmax)/SR(Lmin)= 0.5
        bER=10⁻⁶
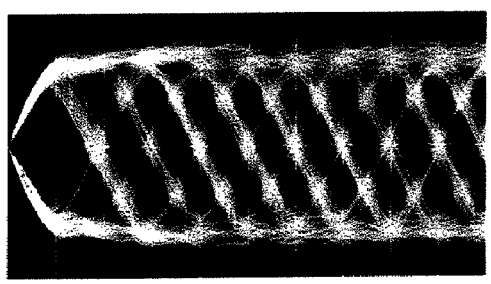
FIG.2D  NR(Lmax)/SR(Lmin)= 1.0
        bER=10⁻⁵
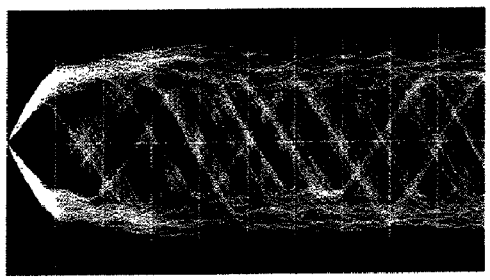
FIG.2E  NR(Lmax)/SR(Lmin)= 2.0
        bER>10⁻²
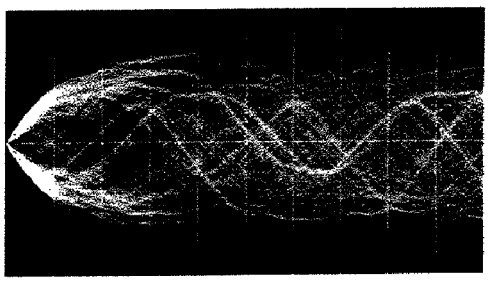

UV RESIN, 0.1t PC SUBSTRATE 1009
1007
1005
1003
1001

PIT   SPACE   0.6t PC SUBSTRATE

INFORMATION RECORDING MEDIA AND PLAYBACK POWER DETERMINING METHOD FOR SIGNAL PLAYBACK

INCORPORATION BY REFERENCE

The present application claims priority from Japanese application JP2007-115006 filed on Apr. 25, 2007, the content of which is hereby incorporated by reference into this application.

BACKGROUND OF THE INVENTION

The present invention relates to information recording media, such as optical disks, and methodology for determination of playback power in a signal playback mode. More particularly but not exclusively, this invention relates to an optical disk medium of the type permitting a playback signal to have its error rate which falls within a practically acceptable range in the case of super resolution technology being used therein. The invention also relates to a signal playback power determination method for use with such optical disks.

Information recording media typically include optical disks or discs, which are currently in widespread use. In optical disk-related technologies, a beam of laser light is focused by a lens module onto a disk for recording (writing) and reproducing (reading) data to and from the disk. Recent advances in such optical disk-related technologies enable optical disks to much increase in storage capacity. The currently available compact discs (CDs) with a diameter of 12 centimeters (cm) have a storage capacity of 650 megabytes (MB) in area density. For commercially available digital versatile disks (DVDs), about 4.7 gigabytes (GB) of storage capacity is achieved per recording layer. For HD-DVDS, 20 GB of data is recordable. For Blu-ray discs (BDs), 25 GB of data is storable. These ultralarge storage capacities of advanced optical disks have been realized mainly by shortening the wavelength λ of a laser light source from 780 nanometers (nm) to 405 nm while at the same time enlarging the numerical aperture (NA) from 0.5 up to 0.85.

For further increase in disk storage capacity, it is considered desirable to employ a method for further shortening the light source wavelength while simultaneously enlarging the lens NA value. However, an approach to further lessening the wavelength is possibly faced with difficulties in retaining high quality of record/playback signals because of the fact that the wavelength-shortened light, such as ultraviolet (UV) light, becomes more readily absorbable by a disk substrate and/or a protective film. Even when the lens NA value is made larger, a beam of near-field light is used as the data read/write light. As this near-field light is very short in distance of propagation, it is required to design optical read/write equipment so that its lens and a recording medium loaded, e.g., optical disk, are placed in very close proximity to each other. This structural configuration is much like the structure of mass-storage hard disk drive (HDD) units for use in personal computers (PCs). Thus, it is likely that it becomes more difficult in the near future to achieve easy media exchange-ability which is one important feature of optical disks.

One of the presently proposed approaches to achieving ultrahigh recording densities by a different method from these methods is to use the so-called super resolution technology. This super resolution technology is the one that provides an optical disk with a certain type of mechanism for enabling successful playback of data being stored at recording marks, called the pits, with size dimensions less than or equal to the optical resolution.

A super resolution technique using a phase change film is disclosed, for example, in Japanese Journal of Applied Physics, Vol. 32, p. 5210. Typically the phase change film is used as a recording layer of several types of recordable optical disk media, such as compact disc-rewritable (CD-RW), DVD random access memory (DVD-RAM), DVD±RW and Blu-ray Disc (BD), and is made of a specific kind of material which changes in phase from a crystalline state to a fused state and also to an amorphous state in a way depending upon application of the heat generated by irradiation of laser light. In a method taught by this Japanese Journal of Applied Physics, Vol. 32, p. 5210, the phase change film is fabricated on or above a substrate of the read only memory (ROM) type. The film formed is for use as a playback layer. When a beam of laser light is irradiated onto the surface of this phase change film in a data read mode, a beam spot is formed thereon, resulting in a portion within this spot being heated and fused. In case the fused portion is higher in reflectivity than non-fused portions, the resultant playback signal becomes a signal which is significantly indicative of a signal component from the fused part. At this time, as the fused surface area is smaller than the spot, a pit signal having its resolution less than or equal to the "native" optical resolution is to be obtained as the playback signal. This kind of material that is variable in optical properties with a change in temperature, which is used for playback of the data being stored at the pits of less than the optical resolution, is called the super resolution material.

Another super resolution technique using a phase change film made of the super resolution material is found in Japanese Journal of Applied Physics, Vol. 43, p. 4921. In a method as disclosed in this paper, an optical disk of the type having both a platinum oxide film and a phase-change recording film is used. A pulse laser beam is irradiated onto the disk to form therein recording marks for data recording in a way similar to mark creation processes in ordinary recordable optical disks, which marks will be read by super resolution playback, thereby improving the recording density. With this method, by irradiation of incoming write laser power, the platinum oxide film is locally expanded, resulting in the thickness of the phase change film being modulated in a way corresponding to the marks created. In a playback mode, only a thin portion of the thickness of the phase change film is fused to thereby obtain the super resolution effect. This enables achievement of a one-time recordable super resolution optical disk, also known as write-once-read-many (WORM) disk.

Still another super resolution technique using a phase change film as the super resolution material is suggested in Japanese Journal of Applied Physics, Vol. 45, p. 2593. In a method disclosed therein, an optical disk is used which is structured so that only pits contain the phase change material and each pit is interposed between adjacent gap spaces, like an isolated island. When reading this disk, the phase change film is partly fused by irradiation of laser light at a portion within the pit of interest so that this pit changes in reflectivity. When this change causes a playback signal to increase in magnitude, a large amount of playback signal is obtained from the pit that is in the fused area within a beam spot. Thus, the intended super resolution is realized. With this method, since the pit is isolated by spaces, it is possible to limit the fused area more successfully than the case of the phase change film being used for an entire disk surface. It is also possible to lessen thermal conduction to its neighboring pits. Accordingly, the use of this method makes it possible to play back the data being stored at ultrasmall sizes of pits.

A multilayer disk design technique is also proposed as one method of achieving higher recording densities in a way different from the techniques disclosed in the above-identified three Japanese technical bulletins. In this multilayer technique, an optical disk is used which is arranged to have a multilayer structure of spaced-apart data layers. Record/playback operations are performed in a way independent of each other while letting a beam of laser light be focused on each layer. Thus, it can be said that the multilayer disk technique is the method for increasing the storage capacity of an optical disk in the direction of its thickness or "volume" in a certain sense.

SUMMARY OF THE INVENTION

As stated above, the super resolution technology is achievable in various ways. Typical playback principle of a super resolution technique is shown in FIGS. 1A and 1B. FIG. 1A is a pictorial representation of a laser beam spot 105 on an optical disk surface having an array of pits 101 and gap spaces 103, which are sequentially scanned by the spot 105. FIG. 1B graphically shows a curve of light intensity distribution 107 of the spot 105 which is at a position shown in FIG. 1A. When the spot 105 is scanning the disk surface as shown in FIG. 1A, a temperature distribution takes place at a surface portion within the spot 105 due to the light intensity distribution 107 of FIG. 1B. At this time, an area having its temperature higher than a temperature change of the optical constant of a super resolution material used for the optical disk medium is called the high-temperature region 109, from which a super resolution (SR) signal is obtainable. The remaining area surrounding the high-temperature region 109 within the spot 105 is a low-temperature region 111, from which a normal resolution (NR) signal is obtained. An ideal playback signal in the case of the super resolution technique applied consists of the SR signal only. This SR signal is the one that is obtained from the high-temperature region 109 which is less in size than the spot 105, so it becomes possible to detect pits whose sizes are less than or equal to the optical resolution.

However, in the actual playback operation, the low-temperature region 111 also is irradiated with the light so that the resulting playback signal becomes a combination of SR signal and NR signal. In the case of playback of a random bit pattern of video data in actual applications, SR signal and NR signal are different signals. Thus, the NR signal acts as noises, which degrade the quality of playback signals.

Calculation results of the relation of NR signal amount versus the eye pattern of a playback signal and its bit error rate (BER)—this rate will be indicated by "bER" hereinafter—are shown in FIGS. 2A to 2E. In the calculation, a BD optics which is 405 nm in wavelength and 0.85 in lens NA was used with value settings which follow: the modulation code was set at 17 PP; the shortest signal length was 75 nm; bit width was 100 nm; spot size was nearly equal to 476 nm, which is given as the wavelength divided by lens NA; within-spot high-temperature region diameter was 75 nm. The magnitude of NR signal is defined by a signal amplitude ratio of NR signal to SR signal. NR signal was a signal obtained from a spot having a diameter of about 476 nm, whereas SR signal was a signal obtained from a spot with its diameter of 75 nm. In this case, run length values of modulation codes for use in optical disk media are represented by Lsr and Lnr (sr, nr=min, min+1, ..., max; Lmin<Lmin+1<...<Lmax). NR signal is a signal obtained from a repeated pattern of pits and gap spaces both having a length Lnr, i.e., pure tone pattern, whereas SR signal is a signal obtained from a pure tone with a length Lsr. The amplitude ratio of NR signal to SR signal is indicated by NR(Lnr)/SR(Lsr). Suppose here that SR(Lmin) is a limited value. For maximization of NR(Lnr)/SR(Lsr), let Lnr=Lmax and Lsr=Lmin. As can be seen from the calculation results of FIGS. 2A-2E, the playback signal decreases in quality with an increase in NR(Lnr)/SR(Lsr): at NR(Lmax)/SR(Lmin)=2, bER becomes larger than $10^{-2}$. This suggests that it is no longer possible to attain the intended error bit rate condition for practical applications: $bER \leq 10^{-5}$.

This NR signal-caused playback signal quality reduction further increases with advances in high density data recording. For instance, in case the shortest pit length is lessened in order to increase the linear recording density, a need is felt to perform playback operations while causing the high-temperature region within a beam spot to have a size almost equal to the shortest pit length. Due to this, the signal ratio NR(Lmax)/SR(Lmin) increases with an increase in linear density. In the case of narrow track designs also, the ratio NR(Lmax)/SR(Lmin) increases due to the fact that neighboring tracks enter to the low-temperature region of the spot. Accordingly, further increases in the disk recording density would result in NR(Lmax)/SR(Lmin) being increased in value, thereby causing the playback signal quality to become impaired.

It is apparent from the foregoing discussion that the super resolution is faced with the risk which follows: with an increase in area recording density, NR signal becomes greater to thereby deteriorate the playback signal; thus, it is difficult to achieve the required bit error rate (bER) suitable for practical applications.

This risk is avoidable by use of an optical disk medium which is specifically designed so that the signal amplitude ratio NR(Lnr)/SR(Lsr) is set to less than or equal to at least one (1), when letting run lengths of modulation codes used therein be given by Lnr and Lsr (where nr, sr=min, min+1, ..., max; Lmin<Lmin+1<...<Lmax).

In the above-noted optical disk medium, the signal amplitude ratio NR(Lnr)/SR(Lsr) is determined by execution of calculations in a way which follows. Let Ph be a prespecified level of playback power, at which the amplitude of a playback signal from a pit having its size less than or equal to the optical resolution becomes a limited value. Let RF(Ph,Lsr) be the amplitude of a playback signal obtained by the playback power Ph from a pit and a gap space of the optical disk medium, both of which have a length Lsr. Let P1 be a predefined level of playback power P1, which is lower than the playback power Ph and at which the amplitude of a playback signal from a recording mark having its size less than or equal to the optical resolution becomes almost zero. Let RF(P1,Lsr) be the amplitude of a playback signal obtained by the playback power P1 from a pit and a space both having a length Lsr of the optical disk medium. Let RF(P1,Lnr) be the amplitude of a playback signal obtained by the playback power P1 from a pit and a space having a length Lnr of the optical disk medium. The playback powers Ph and P1 and the playback signal amplitudes RF(Ph,Lsr) and RF(P1,Lnr) are used to compute RF'(Lsr)=RF(Ph,Lsr)/Ph, NR(Lsr)=RF(P1,Lsr)/P1, NR(Lnr)=RF(P1,Lnr)/P1 and SR(Lsr)=RF'(Lsr)−NR(Lsr). Then, the NR(Lnr) and SR(Lsr) obtained are used to calculate NR(Lnr)/SR(Lsr). The optical disk is specifically arranged so that this NR(Lnr)/SR(Lsr) value is kept less than or equal to 1.

The above-noted solving method will be described in detail below.

As the playback signal quality in the case of using the super resolution technique is affected and deteriorated by the presence of NR signal, it is necessary to reduce the amount of such NR signal in order to attain the bit error rate (BER or "bER") suitable for practical applications. Preferably, the bER value is set at $10^{-5}$ or less. To estimate the amount of NR signal that satisfies $bER \leq 10^{-5}$, a relation between bER and NR(Lnr)/SR(Lsr) was calculated, the result of which is graphically shown in FIG. 3. The calculation here is performed under the same conditions as those of FIGS. 2A-2E while letting Lnr and Lsr be Lnr=Lmax and Lsr=Lmin to ensure that NR(Lnr)/SR(Lsr) becomes maximal. As the lateral axis of the graph of FIG. 3 is normalized by SR signal, a curve connecting together the calculated values shown herein is not dependent on the shortest pit length. From FIG. 3, it can be seen that bER stays very low in value, $10^{-6}$, when the NR(Lmax)/SR(Lmin) is less than or equal to 0.5; when NR(Lmax)/SR(Lmin) becomes 1 or greater, bER exhibits a rapid increase. This suggests that the value of NR(Lmax)/SR(Lmin) is needed to be less than or equal to at least 1 for achievement of $bER \leq 10^{-5}$ which is suitable for practical applications. Although this result is with only NR signal noises being taken into consideration, the reality is that a need is felt to take account of disk media noises and system noises. Consequently, a calculation result of the relation of bER versus NR(Lmax)/SR(Lmin) with such media noises and system noises being taken into consideration is shown in a graph of FIG. 4. This calculation also was performed under the same conditions to FIGS. 2A-2E, wherein an optical disk medium used was 20 dB in standard value of signal-to-noise ratio (SNR). In the case of FIG. 4, it can be seen that the NR(Lmax)/SR(Lmin) value for achievement of the $bER \leq 10^{-5}$ requirement is 0.7 or less. From the foregoing, it is understandable that the NR(Lnr)/SR(Lsr) value must be kept at 1 or less in order to attain $bER \leq 10^{-5}$ and also that this value tends to decrease upon addition of noises other than NR signal.

An explanation will next be given of a method for evaluating the signal amplitude ratio NR(Lnr)/SR(Lsr) in actual optical disk media. When performing playback of an optical disk using a beam of laser light, what is done first is to set up the prespecified level of playback power Ph, at which the amplitude of a playback signal from pits having sizes less than or equal to the optical resolution becomes a limited value. This playback power Ph is determined, for example, to be a playback power level at which the error bit rate (bER) of a playback signal obtained from a random array of pits of the optical disk becomes minimized in value. Let RF(Ph,Lsr) be the resulting amplitude of such playback signal obtained from pits and spaces, both having the run length Lsr, by use of this playback power Ph. This signal is equivalent to a sum of NR signal and SR signal, which is given as RF(Ph,Lsr)/Ph=SR(Lsr)+NR(Lsr)=RF'(Lsr) through standardization by the playback power Ph. Next, another predefined level of playback power P1 is defined, which is less than the playback power Ph and at which the amplitude of a playback signal from those pits having the size less than or equal to the optical resolution becomes almost zero (0). Let FR(P1,Lnr) be a playback signal that is obtained by this playback power P1 from pits and spaces, both having the run length Lnr. This signal is equivalent to NR signal only and thus is given by RF(P1,Lnr)/P1=NR(Lnr) through standardization using the playback power P1. Here, SR(Lsr) is calculated to be equal to RF'(Lsr)−NR(Lnr). Using the calculation results above, NR(Lnr)/SR(Lsr) of the optical disk medium is determined.

The above-stated playback power Ph determination method is not to be construed as limiting the invention and may alternatively be arranged so that the playback power Ph is replaced, for example, by a playback power at which the amplitude of a playback signal obtained from a pure tone pattern with a predetermined run length of modulation codes for use in the optical disk becomes maximum in value. The run length is set at Lmin, for example.

The signal pattern to be read by the playback power Ph or P1 may be any one of a pure tone pattern and a randomly queued pit pattern.

Note here that the lengths Lnr and Lsr used for determination of NR(Lnr)/SR(Lsr) are determined in a way which follows. For example, when considering an optical disk medium wherein the high-temperature region within a beam spot is smaller than the shortest run length Lmin and wherein a region which experiences a change in optical constant of super resolution material of the optical disk stays only within the high-temperature region, the run lengths Lnr and Lsr of the pits to be reproduced exhibit a specific relationship with NR(Lnr) and SR(Lsr) as shown in a graph of FIG. 5. This graph demonstrates that NR(Lnr) reaches its maximum value when Lnr=Lmax and decreases with a decrease in Lnr and then becomes almost zero at Lnr which is less than or equal to the optical resolution and which includes Lmin. SR(Lsr) is kept constant irrespective of the value of Lsr. From here, value selection of Lnr and Lsr is performed in such a way that NR(Lnr)/SR(Lsr) becomes maximal. Thus, Lnr=Lmax and Lsr is at any given value.

The above-stated determination method of the Lnr/Lsr value used for determination of NR(Lnr)/SR(Lsr) is not the one that limits the invention. Consider another case where the optical disk medium is such that the size of the high-temperature region within the spot is larger than a pit having the shortest run length Lmin. In this case, the relation of the run lengths Lnr and Lsr of a pit to be reproduced versus NR(Lnr) and SR(Lsr) is as shown in a graph of FIG. 6. This graph demonstrates that NR(Lnr) is maximized when Lnr=Lmax and decreases with a decrease in Lnr and then becomes almost zero at Lnr which is less than or equal to the optical resolution and which includes Lmin. SR(Lsr) becomes maximal when Lsr'≦Lsr≦Lmax, where Lsr' is the run length of a pit which is equal in size to the high-temperature region. SR(Lsr) decreases as Lsr becomes less than Lsr', and reaches its minimum value at Lmin. From here, value selection of Lnr and Lsr is performed in a way such that NR(Lnr)/SR(Lsr) becomes maximal whereby Lnr=Lmax and Lsr=Lmin are obtained.

The above-stated determination method of Lnr/Lsr value used for determination of NR(Lnr)/SR(Lsr) should not to be construed as limiting the invention. For example, consider the case of an optical disk which is different in medium characteristics from the above-noted optical disk media, wherein the region in which the optical constant of a super resolution material of such optical disk changes is not the high-temperature only and is variable depending upon the size of a pit. The relation of run lengths Lnr and Lsr of a pit to be reproduced versus NR(Lnr) and SR(Lsr) is as shown in a graph of FIG. 7. This graph demonstrates that NR(Lnr) is maximized at Lnr=Lmax and decreases with a decrease in Lnr and then becomes almost zero at Lnr, which is less than or equal to the optical resolution and which includes Lmin. SR(Lsr) becomes maximal at Lsr=Lmax and decreases with a decrease in Lsr and then becomes minimal at Lmin. From here, value selection of Lnr and Lsr is performed in a way such that NR(Lsr)/SR(Lsr) becomes maximal, resulting in Lnr=Lmax and Lsr=Lmin being obtained.

The above-stated determination method of Lnr/Lsr value used for determination of NR(Lnr)/SR(Lsr) is not to be construed as limiting the invention. For example, consider the case of an optical disk medium which is different in medium characteristics from the above-noted optical disk, wherein NR(Lmin) is almost at zero and NR(Lmin+1) is limited in value. With this optical disk, execution of specific signal processing, such as Viterbi decoding or else, results in the bit error rate (bER) becoming the lowest when using the playback power Ph at which NR(Lmin) becomes almost zero. At this time, the relation of run lengths Lnr and Lsr of a pit to be reproduced versus NR(Lnr) and SR(Lsr) is as shown in a graph of FIG. 8. This graph shows that NR(Lnr) is maximized when Lnr=Lmax and decreases with a decrease in Lnr and then becomes almost zero at Lnr which is less than or equal to the optical resolution and which includes Lmin. SR(Lsr) becomes maximal at Lsr=Lmax and decreases with a decrease in Lnr and then becomes almost zero at Lmin, although it has a limited value at Lmin+1. Note here that NR(Lnr)/SR(Lmin)=NR(Lnr)/0 cannot be calculated in any way. Accordingly, value selection of Lnr and Lsr is done in a way such that NR(Lnr)/SR(Lsr) becomes maximal, resulting in Lnr=Lmax and Lsr=Lmin+1.

From the foregoing, it has been made sure that with the use of optical disk media which are designed so that the ratio NR(Lnr)/SR(Lsr) obtained by the above-stated measurement evaluation methodology is set at 1 or less, it is possible to obtain the practical application-suited playback signal quality with the bit error rate of $10^{-5}$ or more (i.e., bER$\leq 10^{-5}$). One possible approach to forcing NR(Lnr)/SR(Lsr) of an optical disk to have a value less than or equal to 1 is to suppress the generation of NR signal. NR signal is the signal that is produced due to variation or fluctuation of reflected light from the low-temperature region within a laser beam spot. This variation of reflected light occurs due to a difference in reflectivity between pits and spaces and also a difference in phase therebetween. Accordingly, in order to reduce NR signal, there is needed an optical disk medium with both the pit/space reflectivity difference and phase difference being set to zero. An example of this optical disk medium is an optical disk which is structured so that only the pits contain the super resolution material. Currently available methods of fabricating such disk structure include a method using chemical mechanical polishing (CMP) process, which is found in a report of International Symposium on Optical Memory (ISOM) 2006, Mo-B-07, titled "Disc Fabrication for Three-Dimensional Pit Selection Using Damascene Process," by Y. Anzai et al.

An optical disk medium fabricated by the CMP process has pits, which are comprised of at least a super resolution material such as GeSbTe, a protective layer material such as $Al_2O_3$, and a reflective layer material such as chromium (Cr) oxides. Spaces are comprised, for example, of at least a protective layer material such as $Al_2O_3$ and a reflective layer material such as Cr oxides.

The protective layer for use in optical disks which are fabricated by the above-noted CMP process may alternatively be made of materials other than $Al_2O_3$, which permit the passage of laser light used for playback—for example, ZnS, ZnO or else.

The reflective film for use in optical disks that are fabricated by the above-noted CMP process may alternatively be made of materials other than Cr oxide, which provide a limited amount of reflection light with respect to the playback or "read" laser light—for example, AgPdCu, metal oxides or the like.

The super resolution material used for optical disks that are fabricated by the above-noted CMP process may alternatively be other similar suitable materials in place of GeSbTe, which appreciably change in optical constant upon receipt of the heat generated by the read light. An example of such materials is GeSbTe with a bismuth (Bi) impurity doped therein.

According to this invention, it is possible to provide a new and improved optical disk medium capable of permitting playback of extra-small pits having size dimensions less than or equal to the optical resolution while at the same time causing the error bit rate (bER) to be lowered to an extent suitable for practical applications.

Other objects, features and advantages of the invention will become apparent from the following description of the embodiments of the invention taken in conjunction with the accompanying drawings.

BRIEF DESCRIPTION OF THE DRAWINGS

FIGS. 2A through 2E are diagrams each showing an exemplary change in eye pattern of a playback signal when NR(Lmax/SR(Lmin) changes in value.

DETAILED DESCRIPTION OF THE INVENTION

Figure 1A:
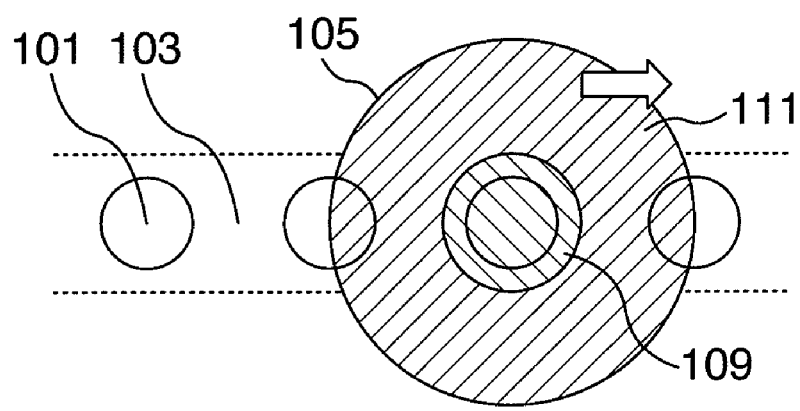
FIGS. 1A and 1B are diagrams for explanation of the principle of one example of super resolution playback.
Figure 1B:
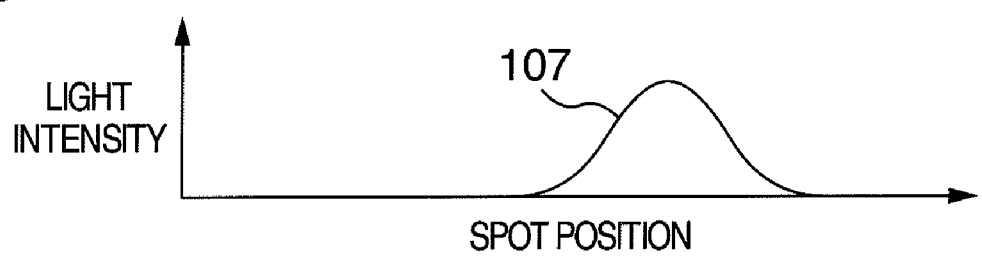
Figure 3:
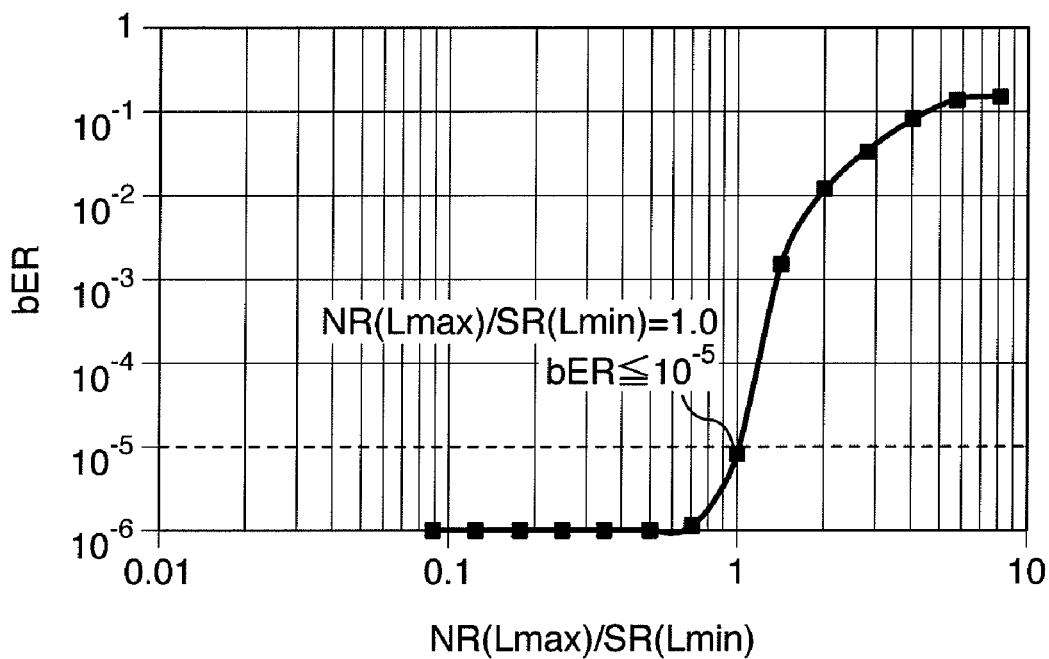
FIG. 3 is a diagram graphically showing an exemplary relationship of bit error rate (bER) versus NR(Lmax)/SR (Lmin) of a playback signal.
Figure 4:
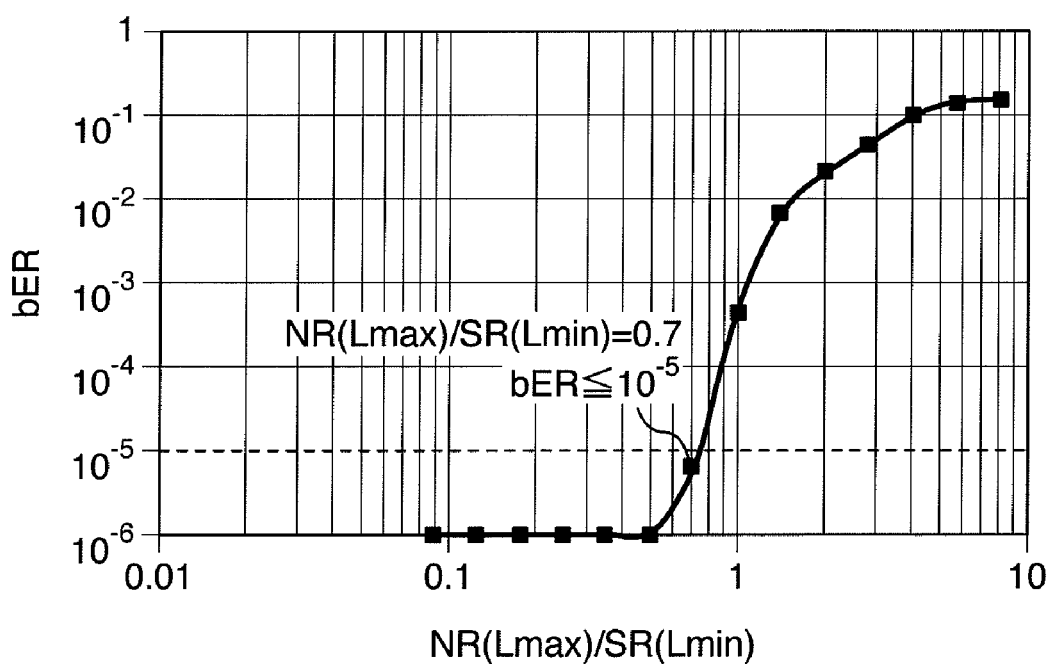
FIG. 4 is a graph showing an exemplary relationship of bER versus NR(Lmax)/SR(Lmin) of a playback signal.

Optical disk or disc media used for super resolution in accordance with embodiments of the present invention, which are suitable for practical applications, will be described with reference to the accompanying figures of the drawing below.

Embodiment 1

In an embodiment 1 below, there will be described an optical disk which is fabricated by CMP process to avoid the problems faced with the prior art. This optical disk is arranged so that only pits are made of a phase change material.

Figure 9A:
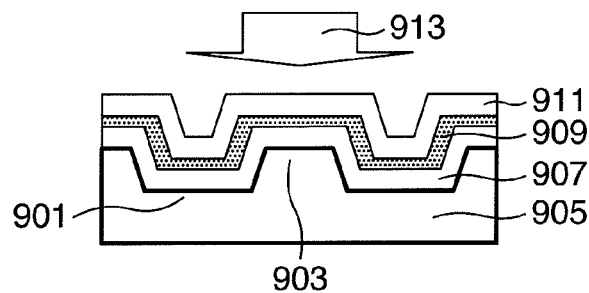
FIGS. 9A to 9G illustrate, in cross-section, some major process steps in the manufacture of an optical disk medium by chemical mechanical polish (CMP) techniques.
Figure 9B:
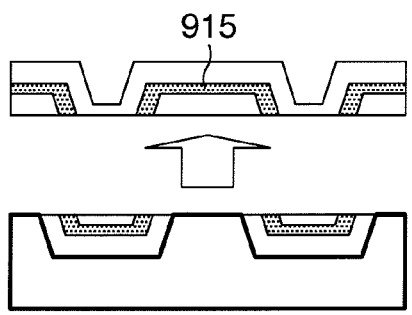
Figure 9C:
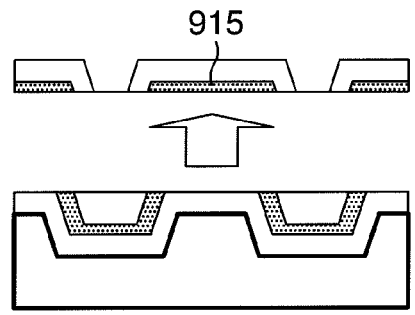
Figure 9D:
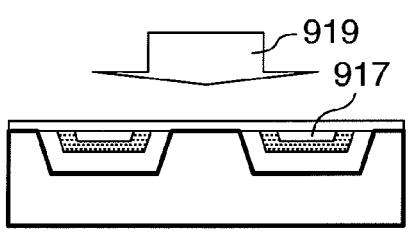
Figure 9E:
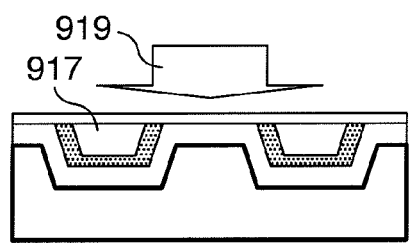
Figure 9F:
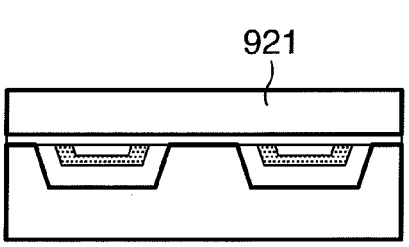
Figure 9G:
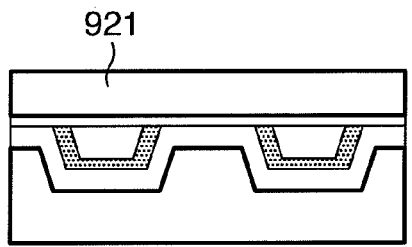

FIGS. 9A to 9G illustrate, in cross-section, some major steps in the manufacture of the optical disk medium by use of CMP process. As shown in FIG. 9A, an array of recording marks called the pits 901 and spaces 903 are formed on the top surface of a read-only memory (ROM) substrate 905. Each pit 901 has a concaved shape whereas space 903 has a convex shape. On the pit/space-formed surface, a multilayer structure is formed including an upper layer 907, phase change film 909 and CMP protective layer 911, which are sequentially formed by sputtering from a direction indicated by arrow 913. The layer 907, 911 has a given film number. The ROM substrate 905 is made of polycarbonate (PC) with a thickness of 0.6 mm, which will be referred to as "0.6t PC" substrate hereinafter. The pits are 68 nm in depth. Signal patterns recorded on ROM substrate 905 include a random pattern and a pure tone pattern with the setting of from 2Tw (Lmin) to 8Tw (Lmax), where Tw is the wobble period and 1Tw is 25 nm. The phase change film 909 is made of a super resolution material, such as GeSbTe. Then, as shown in FIG. 9B or 9C, the optical disk medium of FIG. 9A is subjected to CMP processing to thereby remove portions of a multilayer film 915 at "humps" of the optical disk. At this time, in case the CMP removal is performed to a level corresponding to the upper layer 907 of spaces 901, a structure shown in FIG. 9B is fabricated. Alternatively, when the CMP removal is done to a level of the phase change film 909, a structure shown in FIG. 9C is obtained. A lower layer 917 with a given film number is formed by sputtering from a direction indicated by arrow 919, thereby obtaining a disk structure shown in FIG. 9D or 9E. Next, a 0.1-mm thick PC (0.1t PC) substrate 921 is surface-bonded using an ultraviolet (UV) resin to the structure of FIG. 9D or 9E, thereby providing an optical disk medium shown in FIG. 9F or 9G.

With the optical disk medium having the pits and spaces wherein only the pits are made of the phase change material, the intended super resolution effect is obtainable for the reason which follows. When a beam spot of laser light is scanning on the pit array, the phase change material of each pit within the high-temperature region of the spot is melted or fused to have an optical constant which is different from that in the crystalline state thereof. By such fusion, reflection light significantly changes in amount only when the pit enters to the high-temperature region. Thus, its playback signal offers increased resolution capable of accurately representing high definition data of pits having size dimensions less than or equal to the optical resolution inherent thereto. Another advantage of the optical disk medium thus fabricated lies in its ability to adjust the reflectivity and the phase of pits and spaces independently of each other, by use of a difference in film structure between the pits and spaces.

Figure 10:
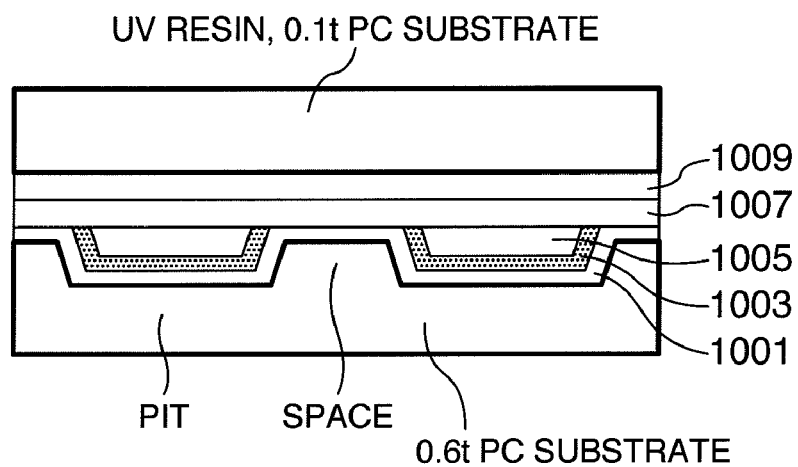
FIG. 10 depicts, in cross-section, an optical disk medium "A" thus fabricated.

One example of the CMP-fabricated optical disk medium embodying the invention is shown in FIG. 10. The disk medium sample "A" shown herein is similar in structure to that shown in FIG. 9F. This sample A is structured from a 0.6t-PC substrate and a lamination of an upper layer 1001 corresponding to the layer 907 in FIG. 9A, a phase change film 1003 corresponding to the film 909 in FIG. 9A, a CMP protection layer 1005 corresponding to the layer 911 of FIG. 9A, and a lower layer 1007, 1009 corresponding to 917 in FIG. 9D, which are formed by sputtering processes in this order of sequence. Materials and thickness values thereof are indicated below.

| Medium A (Disk Structure of FIG. 9F) | | |
| --- | --- | --- |
| | Material | Thickness |
| Upper layer 1001 | $Al_2O_3$ | 30 nm |
| Phase change film 1003 | GeSbTe | 10 nm |
| CMP protector layer 1005 | Cr Oxide | 25 nm |
| 1st Lower layer 1007 | Cr Oxide | 30 nm |
| 2nd Lower layer 1009 | $Al_2O_3$ | 50 nm |

Here, a phase difference between the pits and spaces of the medium A and also respective reflectivity values in case the phase change film is in the crystal state were calculated by multilayer computation, which are listed below.

| | |
| --- | --- |
| Pit reflectivity | 15.5% |
| Space reflectivity | 16.1% |
| Pit/space phase difference | 0.05λ |

Note that each calculation was performed by using a film structure at the center part of a pit and a film structure at the center of a space. From the calculation result, it can be seen that the medium A is very small in phase difference between pits and spaces and also in difference between the pit reflectivity and space reflectivity. Thus, it is thought that the medium A is very less in NR signal.

The medium A fabricated is then evaluated by an optical disk record/playback apparatus to be later described. In the explanation below, the apparatus used for measurement will first be described, followed by demonstration of measurement results of the medium.

Figure 11:
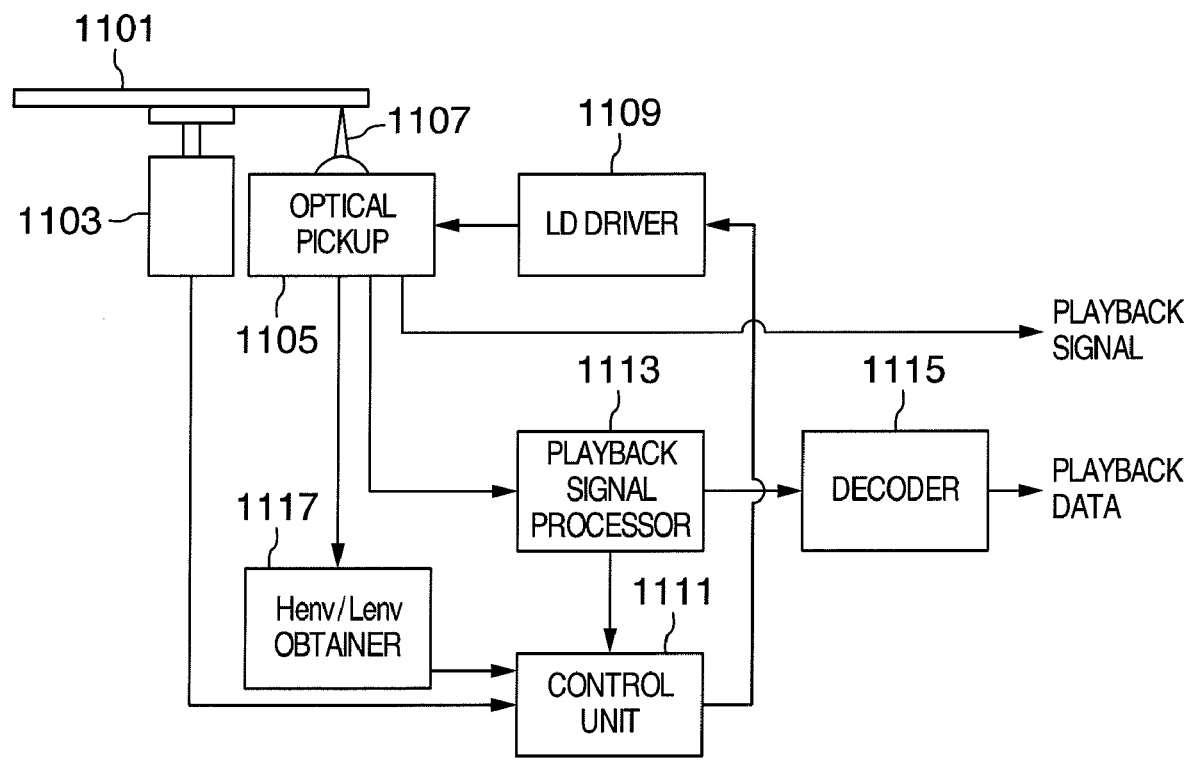
FIG. 11 shows, in block diagram form, a configuration of main part of an optical disk read/write apparatus.

A configuration of the optical disk read/write apparatus is shown in FIG. 11 in block diagram form. An optical disk medium 1101 is rotation-driven by a spindle motor 1103 in a constant linear velocity (CLV) or constant angular velocity (CAV) control mode. An optical pickup unit 1105 is provided so that it opposes the optical disk medium 1101, for guiding a beam of incoming laser light 1107 with a prespecified level of playback power as emitted from a laser diode (LD) to fall onto the optical disk medium 1101 to thereby reproduce a signal(s) thereof. Alternatively, it guides the laser light 1107 with a crystallization power level from the LD to fall onto the optical disk medium 1101 to thereby crystallize the phase change film of the optical disk. The playback power and crystallization power of the laser light 1107 being emitted from the LD are determined by supplying a drive signal from an LD driver unit 1109 to the optical pickup 1105. A playback power level of the laser light 1107 which is emitted from LD is controlled by a control signal from a control unit 1111. A playback signal as output from the optical pickup 1105 is passed to an oscilloscope (not shown) which is provided external to the optical disk apparatus, and is then used for signal evaluation. The output playback signal of the optical pickup 1105 is also supplied to a playback signal processing unit 1113. This playback signal processor 1113 has a radio frequency (RF) amplifier, equalizer, binary converter, phase-locked loop (PLL) unit, and others, which are used to process the playback signal and then supply it to a decoder 1115. The decoder 1115 decodes this signal based on a binarized play back signal and a sync clock signal as reproduced at the PLL unit to thereby generate playback data at its output. Simultaneously, the playback signal processor 1113 supplies an amplified playback signal to the control unit 1111, which is used for the signal evaluation. A high-envelop/low-envelop (Henv/Lenv) acquisition unit 1117 amplifies the playback signal as output from the optical pickup 1105 and, thereafter, calculates a high envelop (Henv) and low envelop (Lenv) of the playback signal, which are then supplied to the control unit 1111 for the signal quality evaluation purpose.

Using the optical disk apparatus of FIG. 11, a playback signal of the optical disk medium A fabricated was evaluated. The playback of this medium was performed by using a semiconductor laser having a light source wavelength of 405 nm and an optical system of objective lens with its numerical aperture (NA) of 0.85. The linear velocity was set at 4.92 meters per second (m/s). For tracking, the push-pull scheme was used.

As the phase change material of the medium A at a time immediately after completion of the fabrication is in an amorphous state, crystallization was first performed by irradiation of laser light with its crystallization power of 4 milliwatts (mW). The reason of this is as follows. The phase change material which was formed by sputtering is in the amorphous state. Thus, it is required to preset the phase change material of every pit in the crystallized state in order to obtain the intended super resolution effect by this optical disk medium.

Figure 12:
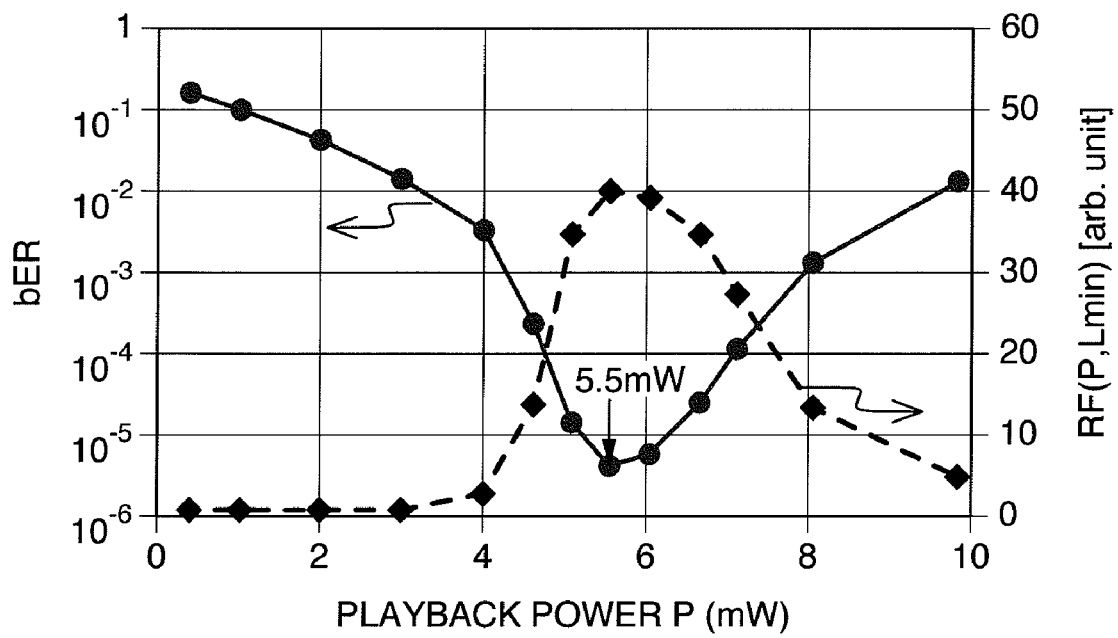
FIG. 12 is a graph showing a relation of bER of a playback signal versus playback power P in the optical disk medium A.

See a graph of FIG. 12, which shows measurement results of the relationship of an error bit rate (bER) of this medium A and the amplitude RF(P,Lmin) of a playback signal to be obtained from a pure tone pattern of the run length Lmin with respect to the playback power P. It is apparent from FIG. 12 that the medium A has its bER having its minimum value of $10^{-5}$ or less and also has playback signal quality suitable for practical applications.

Then, an amount of NR signal of this medium A—i.e., the maximum value of NR(Lnr)/SR(Lsr)—was obtained by a method which follows. As it is apparent from FIG. 12 that the bER value becomes minimal at playback power P is at 5.5 mW, the playback power Ph for obtaining a sum signal of NR signal and SR signal was set to 5.5 mW. As it is also made sure from FIG. 12 that the RF(P,Lmin) stays at almost zero when the playback power P is in a range of from 0.5 mW to 2 mW, the playback power Pl for obtaining only NR signal was set to 1.9 mW. Using these playback powers Ph and Pl, the amplitudes RF(Ph,Lsr) and RF(Pl,Lnr) of a playback signal was measured, which signal obtained from a pure tone pattern having each run length Lsr, Lnr (Lsr, Lnr=Lmin, Lmin+1, . . . , Lmax). Next, SR(Lsr) and NR(Lnr) were calculated by execution of the following arithmetic processing:

$RF(Pl,Lnr)/Pl=NR(Lnr)$, $RF(Ph,Lsr)/Ph-NR(Lsr)=SR(Lsr)$.

Figure 6:
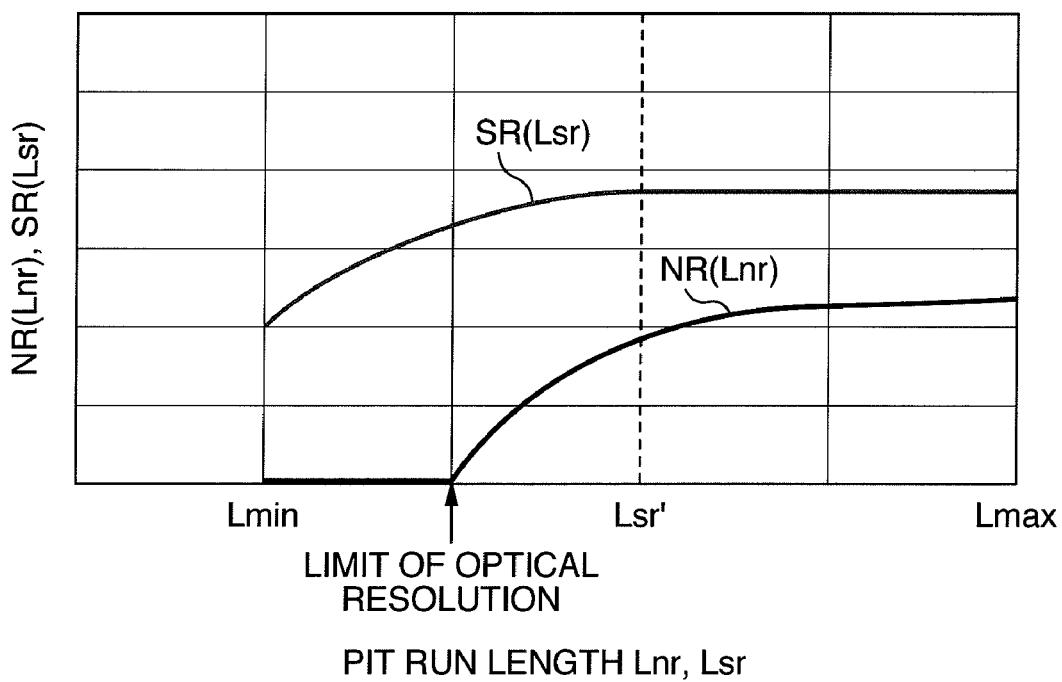
FIG. 6 is a graph showing an exemplary relation of pit run lengths Lsr and Lnr versus SR(Lsr) and NR(Lnr).
Figure 13:
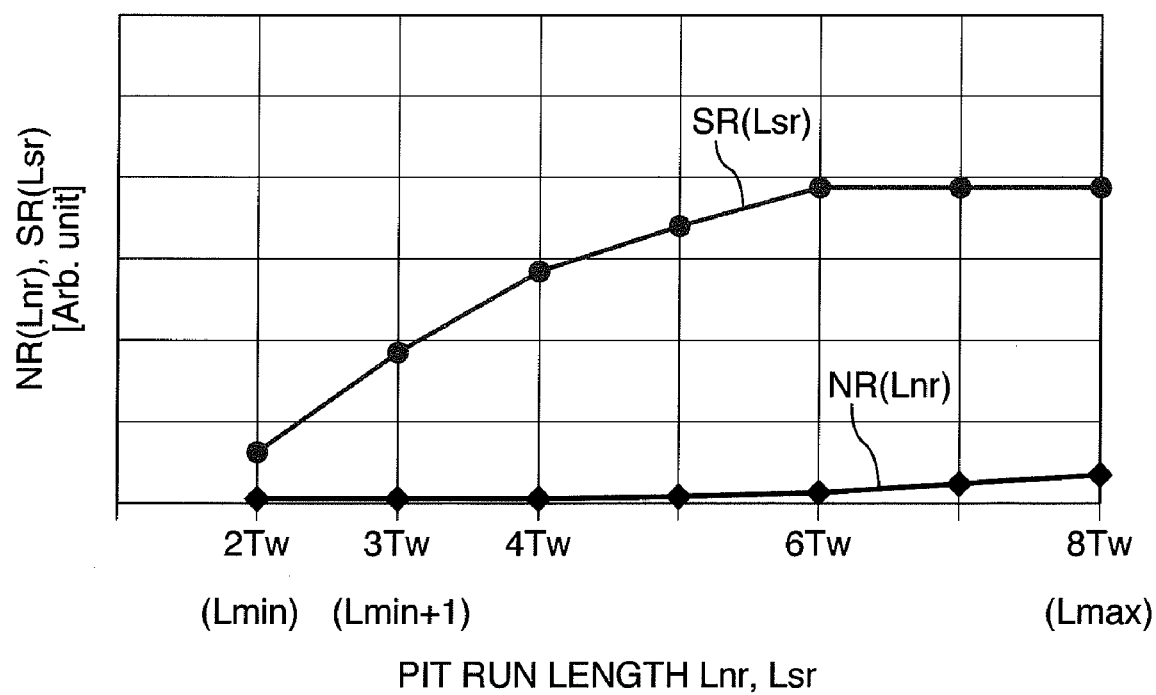
FIG. 13 is a graph showing relations of measured values of pit run lengths Lsr and Lnr versus SR(Lsr) and NR(Lnr) in the optical disk medium A.

The measured values RF(Ph,Lsr) and RF(Pl,Lnr) are shown in Table 1. The relation of the run length Lsr, Lnr and SR(Lsr), NR(Lnr) is shown in a graph of FIG. 13. As the graph of FIG. 13 exhibits similar tendency to that of FIG. 6, it has been found that NR(Lnr)/SR(Lsr) is maximized in value at Lnr=Lmax and Lsr=Lmin and that NR(Lmax)/SR(Lmin) is at 0.4, which satisfies the requirement of being equal to 1 or less ($\leq 1$).

TABLE 1

| Run length Lsr, Lnr | Read signal amplitude (Arb. unit) | |
|---|---|---|
| | RF (Ph, Lsr) (Ph = 5.5 mW) | RF (Pl, Lnr) (Pl = 1.0 mW) |
| 2 Tw (Lmin) | 40 | 0 |
| 3 Tw (Lmin + 1) | 105 | 0 |
| 4 Tw | 154 | 0 |
| 5 Tw | 182 | 0 |
| 6 Tw | 220 | 1 |
| 7 Tw | 226 | 2 |
| 8 Tw (Lmax) | 231 | 3 |

The table above is the one that shows measured values of the playback signal amplitude (Ph,Lsr), RF(P1,Lnr) at each run length Lsr, Lnr of the optical disk medium A.

Embodiment 2

Consider an embodiment 2 which uses the optical disk medium stated in the embodiment 1 while letting Ph be the playback power at which RF(P,Lmin) becomes maximal in value. In this case, from FIG. 12, this playback power Ph becomes equal to 5.5 mW. This is the same as the Ph of the embodiment 1, so similar results to the embodiment 1 were obtained even when using this Ph value.

Embodiment 3

In this embodiment, an explanation will be given below of an example of fabrication of optical disk media A-1 to A10 which are each similar in structure to the optical disk medium A of the embodiment 1 and which are different from the medium A in thickness of the phase change film made of GeSbTe.

| | |
|---|---|
| Medium A-1 | Phase change film: 5.0 nm |
| Medium A-2 | Phase change film: 7.5 nm |
| (Medium A | Phase change film: 10.0 nm) |
| Medium A-3 | Phase change film: 12.5 nm |
| Medium A-4 | Phase change film: 15.0 nm |
| Medium A-5 | Phase change film: 17.5 nm |
| Medium A-6 | Phase change film: 20.0 nm |
| Medium A-7 | Phase change film: 22.5 nm |
| Medium A-8 | Phase change film: 25.0 nm |
| Medium A-9 | Phase change film: 27.0 nm |
| Medium A-10 | Phase change film: 30.0 nm |

Figure 7:
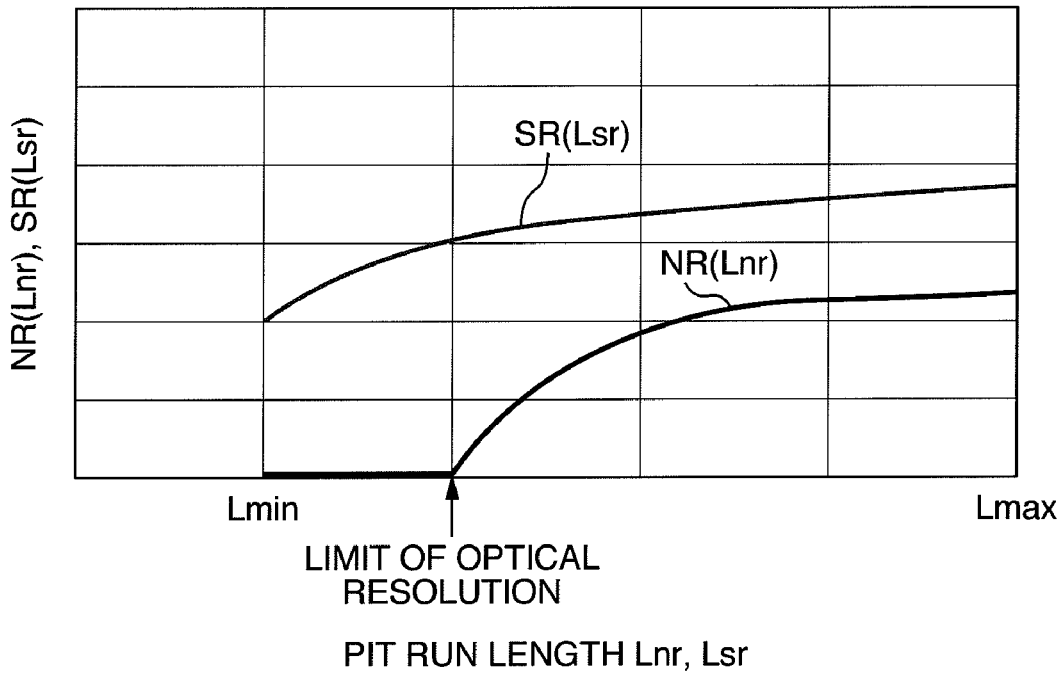
FIG. 7 is a graph showing an exemplary relation of pit run lengths Lsr and Lnr vs. SR(Lsr) and NR(Lnr).
Figure 14:
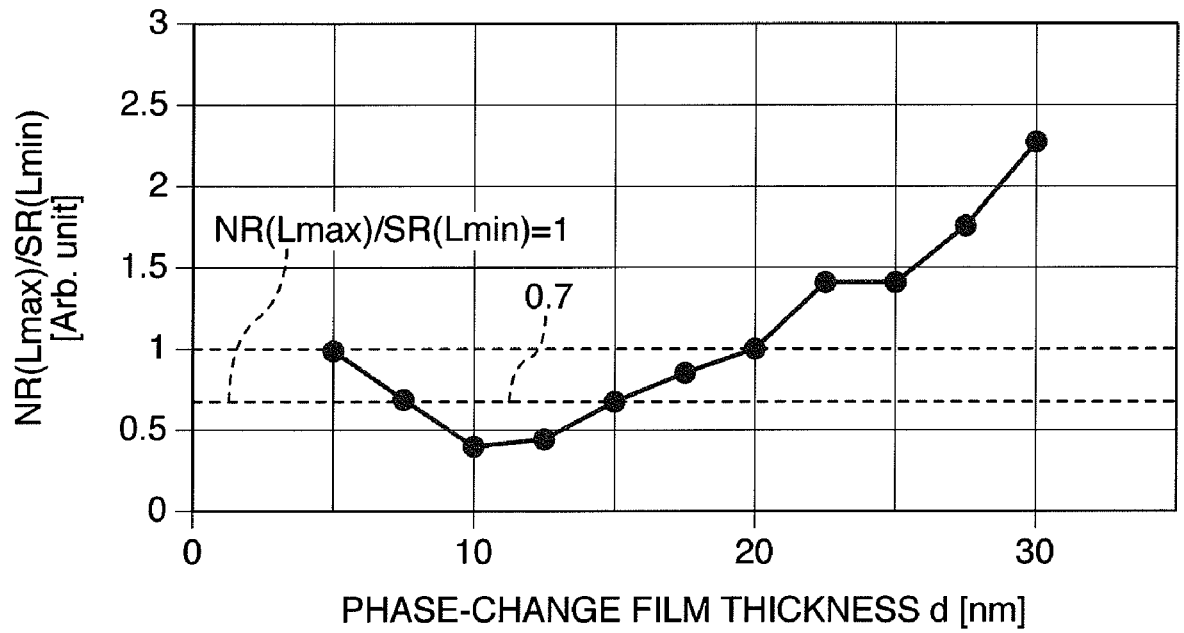
FIG. 14 is a graph showing measurement results of the relation of the thickness of a phase change film and NR(Lmax)/SR(Lmin) in optical recording media A-1 to A-10, which are similar in structure to the optical disk A and which are different in phase change film thickness from one another.

For these optical disk media, the playback power Ph that causes bER to become minimal and the playback power Pl that causes RF(P,Lmin) to be zeroed are determined in a way similar to the embodiment 1. Then, respective playback powers Ph and Pl are used for measurement of the values of RF(Ph,Lmin), RF(Ph,Lmax), RF(Pl,Lmin) and RF(Pl,Lmax) to thereby calculate SR(Lmin), SR(Lmax) and NR(Lmax). These results are shown in Table 2. From table 2, it can be seen that the relationship of run length Lsr, Lnr and SR(Lsr), NR(Lnr) is the same as that of FIG. 6 or FIG. 7 since every medium satisfies SR(Lmin)<SR(Lmax). From here, in all the media concerned, NR(Lnr)/SR(Lsr) becomes maximal at Lnr=Lmax and Lsr=Lmin. In this respect, the relation of thickness d of the phase change film of each medium versus NR(Lmax)/SR(Lmin) is shown in FIG. 14. As apparent from FIG. 14, the media with the phase change film thickness d ranging from 5 nm to 20 nm satisfy NR(Lmax)/SR(Lmin)$\leq 1$.

From the bER values shown in Table 2, it was revealed that $bER \leq 10^{-5}$ is attainable in those media with d=7.5 to 15 nm while satisfying NR(Lmax)/SR(Lmin)≦0.7. One reason of the fact that $bER \leq 10^{-5}$ is obtainable exclusively when NR(Lmax)/SR(Lmin)≦0.7 rather than ≦1 is that the actually implemented measurement must experience the generation of media noises and system noises. Accordingly, it is considered that the goal of bER≦10−5 is attainable by lessening these noises even when NR(Lmax)/SR(Lmin)≦1.

TABLE 2

| Media | Phase change film thickness [nm] | Min. bER | Ph [mW] | Pl [mW] | SR(Lmin) [Arb. unit] | SR(Lmax) [Arb. unit] | NR(Lmax) [Arb. unit] |
|---|---|---|---|---|---|---|---|
| A-1 | 5.0 | $1 * 10^{-4}$ | 5.0 | 1.0 | 4 | 25 | 4 |
| A-2 | 7.5 | $1 * 10^{-5}$ | 5.0 | 1.0 | 6 | 30 | 4 |
| A | 10.0 | $6 * 10^{-6}$ | 5.5 | 1.0 | 7 | 39 | 3 |
| A-3 | 12.5 | $8 * 10^{-6}$ | 5.5 | 1.0 | 7 | 38 | 3 |
| A-4 | 15.0 | $1 * 10^{-5}$ | 5.5 | 1.0 | 7 | 35 | 5 |
| A-5 | 17.5 | $4 * 10^{-5}$ | 5.5 | 1.0 | 9 | 43 | 8 |
| A-6 | 20.0 | $4 * 10^{-4}$ | 5.5 | 1.0 | 7 | 47 | 7 |
| A-7 | 22.5 | $2 * 10^{-03}$ | 6 | 1.0 | 9 | 55 | 13 |
| A-8 | 25.0 | $4 * 10^{-3}$ | 5.5 | 1.0 | 7 | 55 | 10 |
| A-9 | 27.5 | $1 * 10^{-2}$ | 5.5 | 1.0 | 8 | 58 | 14 |
| A-10 | 30.0 | $1 * 10^{-1}$ | 5.5 | 1.0 | 8 | 60 | 18 |

This is the table that shows the measured values of the minimum bER, playback power Ph, playback power P1, SR(Lmin), SR(Lmax) and NR(Lmax) in the media A-1 to A-10, which are similar in structure to the optical disk medium A and which are different therefrom in phase change film thickness.

Embodiment 4

Figure 5:
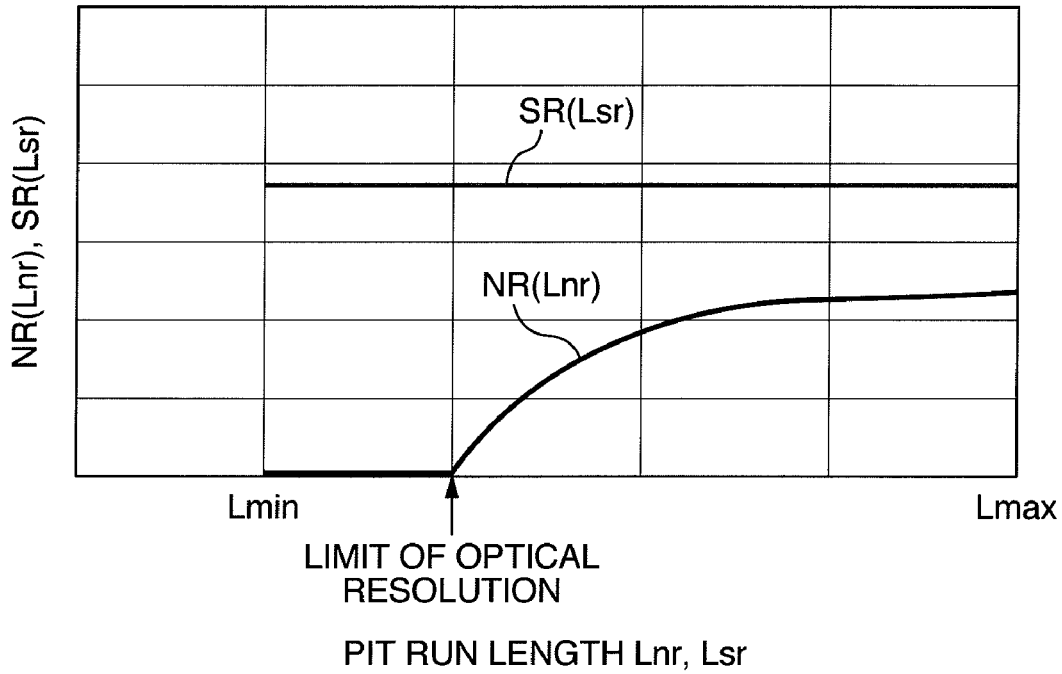
FIG. 5 is a graph showing an exemplary relation of pit run length values Lsr and Lnr versus SR(Lsr) and NR(Lnr).

In this embodiment, an explanation will be given of an example of fabrication of an optical disk medium which is similar in structure to the optical disk medium A of the embodiment 1 and which has its phase change film made of GeSbTe different in composition from that of the medium A. For this medium, the playback power Ph that causes bER to become minimal and the playback power P1 that causes RF(P,Lmin) to become zero are determined in a way similar to the embodiment 1. Then, respective playback powers Ph and P1 are used to measure RF(Ph,Lmin), RF(Ph,Lmax), RF(P1,Lmin) and RF(P1,Lmax) to thereby compute SR(Lmin), SR(Lmax) and NR(Lmax). As a result, it was revealed that the relation of run length Lsr, Lnr versus SR(Lsr), NR(Lnr) is the same as that of FIG. 5 since SR(Lmin)=SR(Lmax) in this medium. From here, the maximum value of NR(Lnr)/SR(Lsr) in this medium may be given as NR(Lmax)/SR(Lmax), where Lnr=Lmax and Lsr=Lmax. The measured value of NR(Lmax)/SR(Lmax) was 0.6. Its bER was at $8 \times 10^{-6}$. Thus it has been found that in this medium also, NR(Lmax)/SR(Lmax)≦1 is satisfiable, thereby enabling achievement of bER≦$10^{-5}$.

Embodiment 5

Figure 8:
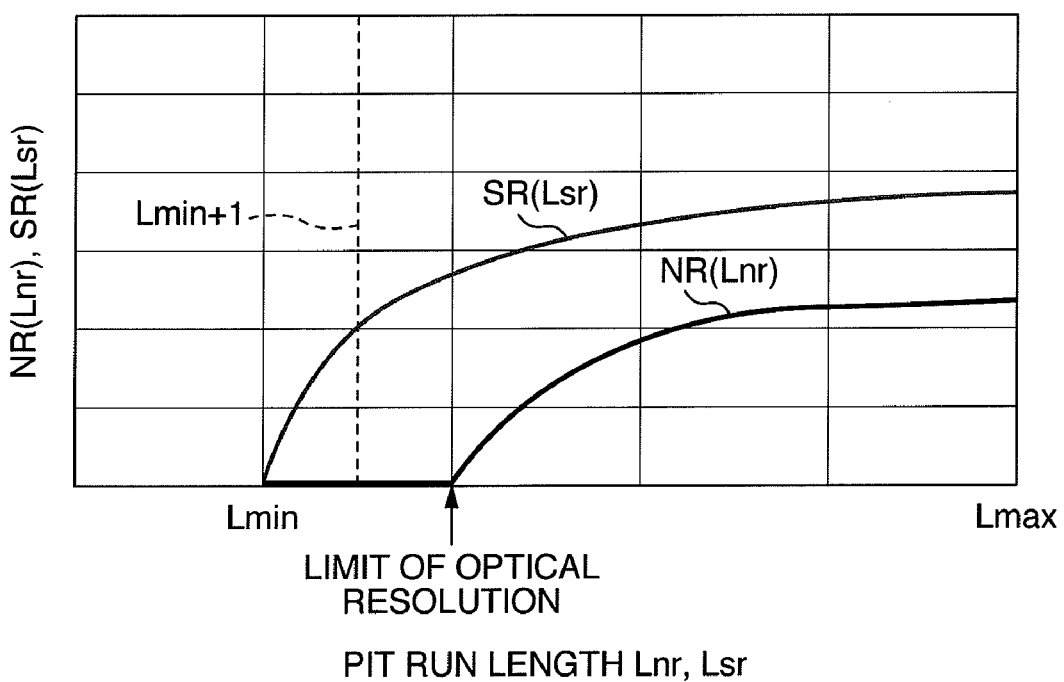
FIG. 8 is a graph showing an exemplary relation of pit run lengths Lsr and Lnr vs. SR(Lsr) and NR(Lnr).

In this embodiment, an explanation will be given of an example of fabrication of an optical disk medium which is similar in structure to the optical disk medium A of the embodiment 1 and which uses for its phase change film a GeSbTe material which is different in composition from that of the medium of the embodiment 4. For this medium, the playback power Ph that causes bER to become minimal and the playback power P1 that causes RF(P,Lmin) to become zero are determined in a way similar to the embodiment 1; then, respective playback powers Ph and P1 are used to measure the values of RF(Ph,Lmin), RF(Ph,Lmin+1), RF(Ph,Lmax), RF(P1,Lmin), RF(P1,Lmin+1) and RF(P1,Lmax) to thereby calculate SR(Lmin), SR(Lmin+1), SR(Lmax) and NR(Lmax). As a result, it was revealed that the relation of run length Lsr, Lnr and SR(Lsr), NR(Lnr) is the same as that of FIG. 8 because SR(Lmin)=0 and SR(Lmin+1)<SR(Lmax) in this medium. From here, the maximum value of NR(Lnr)/SR(Lsr) may be given by NR(Lmax)/SR(Lmin+1), where Lnr=Lmax and Lsr=Lmin+1. A calculated value of NR(Lmax)/SR(Lmin+1) was 0.2, and its bER was at $1*10^{-5}$. Thus it has been found that in this medium also, NR(Lmax)/SR(Lmin+1)≦1 can be satisfied, thereby enabling achievement of bER≦$10^{-5}$.

Figure 15:
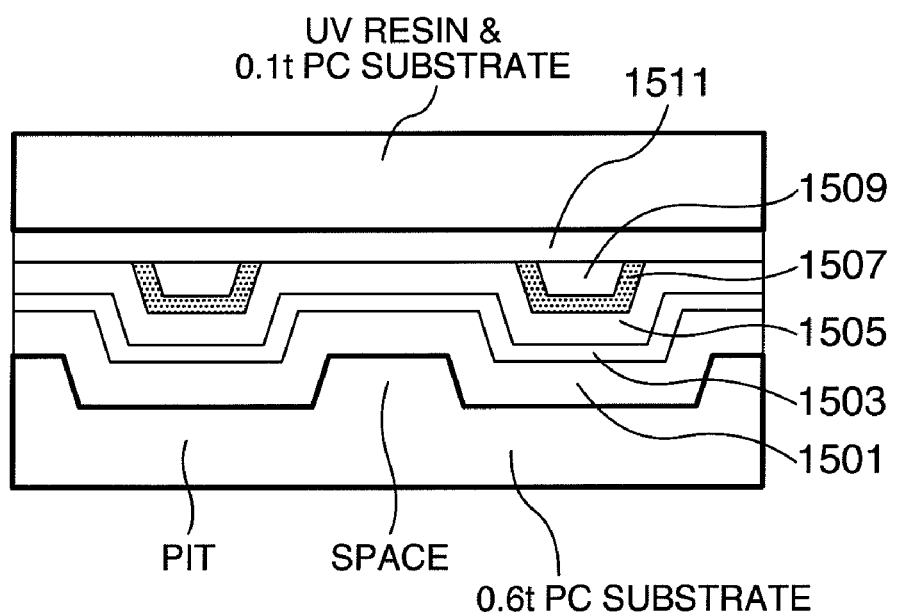
FIG. 15 illustrates, in cross-section, an optical disk medium B.

An explanation will now be given of a comparative example 1, i.e., an example of fabrication of an optical disk medium B which is manufacturable by a process similar to the fabrication method of the optical disk medium as has been recited in the embodiment 1 and which is different in structure from the medium A. A structure of the medium B fabricated is shown in FIG. 15. Materials and thickness values of respective layers of this medium, such as upper layers 1501, 1503 and 1505 (corresponding to the layer 907 shown in FIG. 9A), a phase change film 1507 (corresponding to the film 909 of FIG. 9A), a CMP protector layer 1509 (corresponding to the layer 911 in FIG. 9A), and a lower layer 1511 (corresponding to the layer 917 of FIG. 9D or 9E), are shown below in a sequential order of the fabrication process steps thereof.

| Medium B (Disk Structure of FIG. 9G) | | |
|---|---|---|
| | Material | Thickness |
| 1st upper layer 1501 | $Al_2O_3$ | 60 nm |
| 2nd upper layer 1503 | AgPdCu | 10 nm |
| 3rd upper layer 1505 | $Al_2O_3$ | 40 nm |
| Phase change film 1507 | GeSbTe | 5-30 nm |
| CMP protective layer 1509 | $Al_2O_3$ | 60 nm |
| Lower layer 1511 | $Al_2O_3$ | 50 nm |

Figure 16:
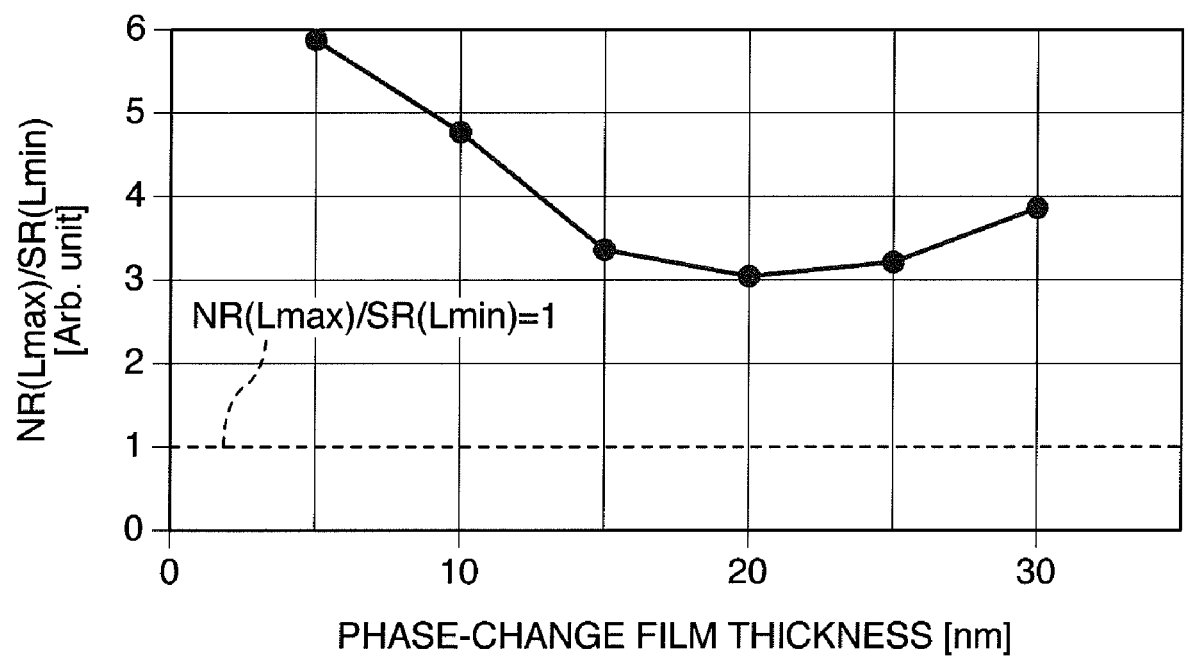
FIG. 16 is a graph showing measurement results of the relation of phase change film thickness versus NR(Lmax)/SR (Lmin) in optical recording media B-1 to B-6, which are similar in structure to the optical disk B and which are different from one other in phase change film thickness.

Here, an attempt was made to fabricate disk media having respective phase change films with thickness values of 5 nm, 10 nm, 15 nm, 20 nm, 25 nm and 30 nm, which were labeled by B-1, B-2, B-3, B-4, B-5 and B-6, respectively. For every medium fabricated, the playback power Ph that causes bER to become minimum and the playback power P1 that zeros RF(P,Lmin) are determined in a way similar to the embodiment 1. Respective playback powers Ph and P1 are used for measurement of the values of RF(Ph,Lmin), RF(Ph,Lmax), RF(P1,Lmin) and RF(P1,Lmax) to thereby calculate SR(Lmin), SR(Lmax) and NR(Lmax). The result is shown in Table 3. From Table 3, it can be seen that the relation of run length Lsr, Lnr versus SR(Lsr), NR(Lnr) is the same as that of FIG. 6 or FIG. 7 since SR(Lmin)<SR(Lmax) in every medium. From here, every medium's NR(Lnr)/SR(Lsr) is maximized in value at Lnr=Lmax and Lsr=Lmin. Consequently, the relation of phase change film thickness d and NR(Lmax)/SR(Lmin) is shown in FIG. 16. From FIG. 16, it is seen that in all the media involved, NR(Lmax)/SR(Lmin)>1. From Table 3, it is made sure that bER>$10^{-5}$. It is thus revealed that with these media, any playback signals suitable for practical applications are hardly obtainable.

TABLE 3

| Media | Phase change film thickness [nm] | Min. bER | Ph [mW] | Pl [mW] | SR(Lmin) [Arb. unit] | SR(Lmax) [Arb. unit] | NR(Lmax) [Arb. unit] |
|---|---|---|---|---|---|---|---|
| B-1 | 5  | 2 * $10^{-1}$ | 3.0 | 1.0 | 5  | 10 | 30 |
| B-2 | 10 | 2 * $10^{-2}$ | 3.5 | 1.0 | 7  | 18 | 34 |
| B-3 | 15 | 9 * $10^{-4}$ | 3.5 | 1.0 | 9  | 26 | 30 |
| B-4 | 20 | 4 * $10^{-4}$ | 3.5 | 1.0 | 10 | 26 | 30 |
| B-5 | 25 | 8 * $10^{-4}$ | 3.5 | 1.0 | 9  | 30 | 29 |
| B-6 | 30 | 2 * $10^{-3}$ | 3.5 | 1.0 | 12 | 32 | 47 |

The table above is the one that shows the measured values of the minimum bER, playback power Ph, playback power P1, SR(Lmin), SR(Lmax) and NR(Lmax) of the media B-1 to B-6, each of which has the structure of the optical disk medium B and which are different from one another in phase change film thickness.

An explanation will be given of the reason why these media are kept larger in NR(Lmax)/SR(Lmin), which is always greater than or equal to 1. Each of these media has the structure shown in FIG. 15; at the boundary of its pit and space, a structural body is present which is different from the center part of a pit and space. This structure is such that the $Al_2O_3$ part of the upper layer which is interposed between AgPdCu and GeSbTe stands vertically relative to the surface of optical disk medium. When incident laser light falls onto this structure, the incident light exhibits multiple interference by the presence of AgPdCu and GeSbTe in the $Al_2O_3$ film so that its reflection light has a phase and reflectivity which are different from those of light as reflected off from the center part of a pit or space. This result in generation of NR signal during playback, which is derived from this boundary structure. In this way, the optical disk structure of FIG. 15 is faced with the risk as to NR signal generation; thus, it is considered that this disk cannot satisfy NR(Lmax)/SR(Lmin)≦1.

Regarding the structure (FIG. 10) of the optical disk medium A which is represented by the embodiment 1, this disk structure also is such that a structural body different from the center part of a pit or space exists at the boundary of such pit and space in a similar manner to that shown in FIG. 15. However, in this structure, the $Al_2O_3$ of the upper layer is not interposed between the phase change film and the reflective film but placed in close proximity to the 0.6t-PC substrate. Accordingly, the incident light falling onto this structure passes through it to the 0.6t-PC substrate without having to induce the multiple interference. This light passage makes it possible to obtain from the bit/space boundary the reflection light that is the same in phase as reflected light from the space. Therefore, there is no risk that NR signal is produced due to this boundary structure. It is thus considered that NR(Lmax)/SR(Lmin)≦1 was attained with the optical disk structure of FIG. 10.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An information recording medium having pits with a size less than or equal to an optical resolution, for causing an amplitude of a playback signal to become a limited value upon irradiation of laser light with a prespecified level of power, wherein by letting Ph be the prespecified power, letting RF(Ph,Lsr) be the amplitude of a playback signal obtained by said prespecified power Ph from a pit and a space both having a length Lsr, letting P1 be a power which is less than said power Ph and which causes a playback signal from a pit having said size to have its amplitude which is almost zero (0), and letting RF(P1,Lnr) be the amplitude of a playback signal obtained from a pit and a space both having a length Lnr, the following equations are defined:

$RF'(Lsr)=RF(Ph,Lsr)/Ph,$ $NR(Lsr)=RF(P1,Lsr)/P1,$ $NR(Lnr)=RF(P1,Lnr)/P1,$ and $SR(Lsr)=RF'(Lsr)-NR(Lsr),$ and wherein when said length Lnr is greater in size than said optical resolution, a value of NR(Lnr) divided by SR(Lsr) is less than or equal to one (1).

2. An information recording medium according to claim 1, wherein an error rate of a playback signal from said pits which are queued at random becomes minimized when the power of a beam of incoming laser light is at said prespecified power Ph.

3. An information recording medium according to claim 1, wherein a signal to noise (S/N) ratio of a playback signal from said pit with a modulation code having a predetermined run length becomes maximal when the power of a beam of incoming laser light is at said prespecified power Ph.

4. An information recording medium according to claim 1, wherein while letting Lmax be the largest run length of modulation codes and letting Lnin be the shortest run length of the modulation codes, when Lmax is larger in size than the optical resolution and Lmin is smaller in size than the optical resolution, said length Lsr and said length Lnr satisfy: Lsr=Lnr=Lmax.

5. An information recording medium according to claim 1, wherein while letting Lmax be the longest run length of modulation codes and letting Lmin be the shortest run length of the modulation codes, when Lmax is larger in size than the optical resolution and Lmin is less in size than the optical resolution, said length Lsr is Lmin whereas said length Lnr is Lmax.

6. An information recording medium according to claim 1, wherein while letting Lmax be the longest run length of modulation codes and letting Lmin be the shortest run length of the modulation codes, when Lmax is larger in size than the optical resolution and Lmin is less in size than the optical resolution, said length Lsr is Lmin+1 whereas said length Lnr is Lmax, where Lmin+1 is the second shortest run length next to Lmin.

7. A method for determining playback power during reproduction of a signal from an information recording medium having pits with a size less than or equal to an optical resolution, which causes an amplitude of a playback signal to become a limited value upon irradiation of laser light with a prespecified level of power, wherein said prespecified level of power is determined in such a way that an error rate of a playback signal from said pits which are randomly arrayed becomes minimal in value.

8. A method of determining playback power during reproduction of a signal from an information recording medium having pits with a size less than or equal to an optical resolution, which causes an amplitude of a playback signal to become a limited value upon irradiation of laser light with a prespecified level of power, wherein said prespecified level of power is determined in such a way that a signal to noise (S/N) ratio of a playback signal from said pits with modulation codes having a predetermined run length becomes maximal.

* * * * *